United States Patent [19]

Hoehne et al.

[11] 4,144,203

[45] Mar. 13, 1979

[54] PROCESS FOR THE PREPARATION OF CHLORINATED POLYMERS

[75] Inventors: Klaus Hoehne; Johann Jelen; Diez Heine, all of Leverkusen; Rolf Baatz, Dormagen, all of Fed. Rep. of Germany

[73] Assignee: Bayer Aktiengesellschaft, Leverkusen, Fed. Rep. of Germany

[21] Appl. No.: 689,684

[22] Filed: May 24, 1976

Related U.S. Application Data

[63] Continuation-in-part of Ser. No. 685,313, May 11, 1976, abandoned, which is a continuation of Ser. No. 526,578, Nov. 25, 1974, abandoned.

[30] Foreign Application Priority Data

Nov. 29, 1973 [DE] Fed. Rep. of Germany ....... 2359461

[51] Int. Cl.$^2$ ............................................. C08F 8/22
[52] U.S. Cl. .................. 260/3.3; 260/17 R; 260/22 CB; 260/22 XA; 260/827; 260/852; 260/854; 260/873; 260/890; 260/897 C; 526/43; 526/45; 528/500

[58] Field of Search .............. 260/3.3, 22 CB, 22 XA, 260/897 C, 890; 528/500; 526/43, 45

[56] References Cited

U.S. PATENT DOCUMENTS

| | | | |
|---|---|---|---|
| 2,067,172 | 1/1937 | Carothers | 260/6 |
| 2,232,429 | 2/1941 | Bennett | 260/735 |
| 2,301,926 | 11/1942 | Blömer et al. | 260/86 |

OTHER PUBLICATIONS

Billmeyer, Textbook of Polymer Science, Sec. Ed., Wiley–Interscience, N.Y., 1971.

*Primary Examiner*—John C. Bleutge
*Attorney, Agent, or Firm*—Connolly and Hutz

[57] ABSTRACT

A process for the preparation of a chlorinated aliphatic polymer which comprises chlorinating a chlorine-free aliphatic polymer in a chlorinated hydrocarbon solvent using gaseous chlorine as the chlorinating agent; adding from 2 to 25% by weight, based on the chlorinated polymer, of at least one plasticizer and/or at least one lacquer resin, to the chlorination solution; and isolating the chlorinated aliphatic polymer from the chlorination solution by steam distillation.

2 Claims, No Drawings

PROCESS FOR THE PREPARATION OF CHLORINATED POLYMERS

CROSS-REFERENCE TO RELATED APPLICATIONS

This application is a continuation-in-part of application Ser. No. 685,313 filed May 11, 1976 and now abandoned, which, in turn, is a continuation of application Ser. No. 526,578 filed Nov. 25, 1974 and now abandoned.

Chlorinated aliphatic polymers, e.g. chlorinated products of natural rubber, polyisoprene, polyethylene and polypropylene, are used as binders, e.g. for paints, adhesives and printing inks. They are usually prepared by chlorinating polymers in a conventional manner with gaseous chlorine, using chlorinated hydrocarbons, such as carbon tetrachloride, trichloroethylene, chloroform or tetrachloroethane as solvents.

The paints, adhesives and printing inks prepared from these chlorinated polymers generally contain a plasticiser and/or other binders, referred to hereinafter as "lacquer resins", pigments, and optionally, solvents.

Chlorinated polymers are produced commercially by dissolving the chlorine-free polymer in a chlorine-resistant organic solvent at a temperature of from 60° to 120° C., introducing gaseous chlorine until the desired degree of chlorination has been reached and isolating the chlorinated polymer from the reaction solution. The chlorinated polymer can be isolated, e.g. by precipitating with an organic liquid in which it is insoluble but which is miscible with the chlorine-resistant solvent (organic liquids suitable for use as precipitating agents are, for example, aliphatic alcohols, such as methanol, and liquid aliphatic hydrocarbons boiling at about 250° C. such as petroleum hydrocarbons or white spirits). Precipitating by means of an organic liquid is avoided if possible because it involves processing of large quantities of solvent mixture. It is preferred to isolate the chlorinated polymer from the reaction solution by steam distillation. The solid chlorinated polymer obtained in this way still contains water or solvent and is dried in the conventional manner.

Even after drying the solid chlorinated polymer obtained still contains occluded considerably quantities, on an average about 6 to 10% by weight of chlorine-resistant solvent, such as carbon tetrachloride, trichloroethylene or tetrachloroethane which are highly toxic and volatile. These residual solvents cannot be removed by distillation or drying directly but first a suitable solvent, for example toluene, methanol or methyl ethyl ketone has to be added to the solid chlorinated polymer before or after drying and then the mixture has to be distilled. This additional process step requires expensive apparatus and consumes a large amount of energy.

It is an object of this invention to provide a process by which chlorinated polymers containing substantially less chlorinated solvent are obtained without the additional process step and expenditure of energy. To reduce the amount of chlorinated solvents in the polymers is also desirable to prevent environmental pollution. The toxic solvent residues are generally liberated as vapours when the polymers are processed, for example when they are redissolved, or when a coating (paint) dries slowly. This liberation of solvent is highly undesirable from the point of view of industrial hygiene. It is also necessary for technical reasons because their vapours corrode many substances. For most purposes, it is sufficient to reduce the residual solvent content by about 50%.

This object is achieved, generally speaking, by adding lacquer resins and/or plasticisers, which have to be added in any case to the solution of chlorinated polymers in chlorine-resistant solvents before the solid product is recovered by steam distillation instead of after recovery of the solid product. This simply expedient reduces the solvent content of the solid chlorinated polymer to about 0.1 to 3% by weight.

This invention therefore relates to a process for the preparation of chlorinated aliphatic polymers by chlorinating the appropriate chlorine-free polymers with gaseous chlorine in a chlorinated hydrocarbon solvent and isolating the chlorinated aliphatic polymer from the chlorination by steam distillation, wherein 2-25% by weight of a lacquer resin is added to the chlorination solution before steam distillation.

Aliphatic polymers which may be subjected to this process are, in particular, diene rubbers, such as natural rubber, polyisoprene and polybutadienes, and α-olefin polymers, such as polyethylene, polypropylene and ethylene-propylene-copolymers.

In principle any polymers which may be hardened by air drying, by the action of heat or of catalysts are suitable lacquer resins. Particularly suitable lacquer resins include the alkyd resins, e.g. reaction products of long chain unsaturated fatty acids, benzoic acid, trimethylolpropane and phthalic acid anhydride; urethane-formaldehyde resins, such as condensation products of butyl urethane and formaldehyde; melamine-formaldehyde resins; urea-formaldehyde resins; polymers and copolymers of alkyl acrylates or methacrylates, such as polyethyl acrylate and polybutyl acrylate; copolymers or vinyl isobutyl ether; copolymers of ethyl acrylate or butyl acrylate with vinyl acetate; xylene-formaldehyde resins; aldehyde and ketone resins; silicone resins, e.g. resins on the basis of the structural units $C_6H_5SiO_{3/2}$; $(CH_3)_2SiO$: $C_6H_5(CH_3)SiO$; cellulose derivatives, e.g. cellulose mixed esters with acetic acid and butyric acid containing small quantities of hydroxyl groups; and hydrocarbon resins, e.g. solid distillation products of petroleum and tar distillations with melting points of 60°–140° C.

The plasticiser and/or the lacquer resins may be added alone or as a combination of plasticiser and lacquer resin. The only condition to be observed is that the additives must be compatible with each other and with the chlorinated polymer. The total quantity of additives is generally 2 to 25% by weight, preferably 2 to 14% by weight, most preferably 5 to 10% by weight, based on the chlorinated polymer.

EXAMPLES (A) Preparation of the chlorinated polymer

1. Chlorinated 1,4-cis-polyisoprene 1,4-cis-polyisoprene is dissolved in carbon tetrachloride at 70° C. with the aid of azo-isobutyric acid dinitrile. Gaseous chlorine is introduced into the resulting solution at 50°–60° C. until the polymer has a chlorine content of 64–70%, preferably 66–67%. Gases dissolved in the solution are removed by boiling.

2. Chlorinated natural rubber

Natural rubber of First Latex Crepe quality is dissolved in carbon tetrachloride at 80° C. by the addition of benzene sulphonic acid hydrazide. Gaseous chlorine is introduced into the solution at 50°–60° C. until the polymer has a chlorine content of 64–70%. preferably 65–66%. Gases dissolved in the solution are removed by boiling.

3. Chlorinated polyethylene

Polyethylene with a molecular weight of about 3000 is dissolved in carbon tetrachloride at boiling point and chlorinated by the introduction of gaseous chlorine at 65° C. until it has a chlorine content of 63–70% preferably 64.5–65.5%. Gases dissolved in the solution are removed by boiling.

4. Chlorinated polypropylene

Gaseous chlorine is introduced at 70° C. into a suspension in carbon tetrachloride of isotactic polypropylene with a reduced specific viscosity $\eta_{red}$ of 5 dl/g (method of measuring: c = 0.1 in Dekalin at 135° C.) until the polymer has passed into solution and has a chlorine content of 62–66% preferably 64–65%. The solution is degasified by boiling.

(B) Processing:

Example 1 (comparison example)

A solution of 100 g of chlorinated 1,4-cis-polyisoprene (chlorine content 66% viscosity 20 cP determined in a Höppler viscosimeter on a 20% solution in toluene at 20° C.) in 650 g of carbon tetrachloride obtained according to Example A part 1) is adjusted to pH 11 with 5% aqueous soda solution without any further additive. The emulsion obtained is stirred into water at 90° C. in the course of 2 hours. A mixture of solvent and steam is driven off by additional heating. The precipitated chlorinated 1,4-cis-polyisoprene is filtered off and dried in a vacuum drying cupboard at 80° C. The dry product contains 8.9% by weight of carbon tetrachloride.

Example 2

7 g of a mixture of $C_{10}$–$C_{18}$ alkyl sulphonic acid phenyl esters (7% by weight based on chlorinated polyisoprene) are added to a solution of 100 g of chlorinated 1,4-cis-polyisoprene (chlorine content 66% viscosity 42 cP) in 650 g of carbon tetrachrloide obtained according to Example A part 1), and the reaction mixture is adjusted to pH 11 with 5% soda solution. The resulting emulsion is then worked-up as in Example 1. A product containing 3.4% by weight of carbon tetrachloride is obtained.

Example 3

14 g of a mixture of $C_{10}$–$C_{18}$ alkyl sulphonic acid phenyl esters (14% by weight based on chlorinated polyisoprene) are added to a solution of 100 g of chlorinated 1,4-cis-polyisoprene (chlorine content 66% viscosity 30 cP) in 650 g of carbon tetrachloride obtained according to Example A part 1) and the reaction mixture is adjusted to pH 11 with 5% soda solution. The resulting emulsion is worked-up as in Example 1. A product containing 0.8% by weight of carbon tetrachloride is obtained.

Example 4

7 g of $C_{10}$–$C_{18}$ alkyl sulphonic acid phenyl esters (7% by weight based on the chlorinated rubber) are added to a solution of 100 g of chlornated natural rubber (chlorine content 67% viscosity 50 cP) in 650 g of carbon tetrachloride obtained according to Example A part 2) and the reaction mixture is adjusted to pH 11 with 5% soda solution. The resulting emulsion is worked-up as in Example 1. A product containing 3.1% by weight of carbon tetrachloride is obtained.

Example 5

10 g of $C_{10}$–$C_{18}$ alkyl sulphonic acid phenyl esters (10% by weight based on chlorinated polyethylene) are added to a solution of 100 g of chlorinated polyethylene (chlorine content 69% viscosity 11 cP) in 900 g of carbon tetrachlroide prepared according to Example A part 3) and the reaction mixture is adjusted to pH 11 with 5% soda solution. The process is then continued as described in Example 1. A product containing 0.2% by weight of carbon tetrachlroide is obtained.

Example 6

10 g of $C_{10}$–$C_{18}$ alkyl sulphonic acid phenyl esters (10% by weight based on chlorinated polypropylene) are added to a solution of 100 g of chlorinated polypropylene (chlorine content 64% viscosity 37 cP) in 600 g of carbon tetrachloride prepared according to Example A part 4) and the reaction mixture is adjusted to pH 11 with 5% soda solution. It is then treated as described in Example 1. A product containing 0.1% by weight of carbon tetrachloride is obtained.

Example 7

14 g of an alkyd resin of soya oil fatty acid, benzoic acid, trimethylolpropane and phthalic acid anhydride dissolved in 9 g of xylene are added to a solution of 100 g of chlorinated 1,4-cis-polyisoprene (chlorine content 66% viscosity 20 cP) in 650 g of carbon tetrachloride prepared according to Example A part 1) and the reaction mixture is adjusted to pH 11 with 5% soda solution. It is then worked-up as described in Example 1. A product containing 1.0% by weight of carbon tetrachloride is obtained.

Example 8

A solution of 160 g of chlorinated 1,4-cis-polyisoprene (66% chlorine; viscosity 10 cP, determined in a 20% toluene solution at 20° C. in a Höppler-viscosimeter) in 700 g carbon tetrachloride was mixed with 40 g of a methacrylic acid butyl ester/methacrylic acid ethyl ester copolymer and 5% aqueous sodium carbonate solution was added to obtain a pH of 9–10. Into the emulsion thus formed water was sprayed at a temperatureof 90° C. A solvent steam mixture was removed by means of additional heating. After drying in a vacuum at 70° to 80° C. a white pulverulent product was obtained (viscosity of a 20% solution in toluene 22 cP, determined as above). The content of carbon tetrachloride is 1.5% by weight.

Example 9

A solution of 160 g of chlorinated 1,4-cis-polyisoprene (chlorine content 66%; viscosity 10 cP, determined in a 20% toluene solution at 20° C.) in 700 g of carbon tetrachloride was mixed with 40 g of an elastomeric polymethyl methacrylate (density 1.03 g/cm$^3$, molecular weight about 55000; viscosity of a 40% solution in toluene at 20° C. 265 cP). Subsequently a 5% aqueous sodium carbonate solution was added so that a pH of 9–10 was found. The emulsion obtained was treated as in Example 8. A product was obtained having a carbon tetrachloride content of 1.2% (viscosity of a 20% solution of the product in toluene at 20° C. about 21 to 22 cP).

We claim:

1. A process for preparing a chlorinated aliphatic polymer which comprises chlorinating a chlorine free polymer selected from the group consisting of natural rubber, polyisoprene, polybutadiene, polyethylene, polypropylene and ethylene-propylene copolymer in a chlorinated hydrocarbon solvent with gaseous chlorine as the chlorinating agent, adding to the chlorinated reaction mixture from 2 to 25% by weight, based on the chlorinated polymer, of at least one member selected from the group consisting of alkyd resins, urethane-formaldehyde resins, melamine-formaldehyde resins, urea-formaldehyde resins, polymers and copolymers of alkylacrylates and methacrylates, aldehyde and ketone resins, silicone resins, cellulose derivatives, and hydrocarbon resins and then isolating chlorinated aliphatic polymer from the chlorinated reaction mixture by steam distillation.

2. A process as claimed in claim 1, wherein the amount of said member component is 2 to 14% by weight.

* * * * *